United States Patent [19]

Hong et al.

[11] Patent Number: 4,965,713

[45] Date of Patent: Oct. 23, 1990

[54] TERMINAL ELEMENT

[75] Inventors: Ing-Tsann Hong; Ernest C. Fitch, both of Stillwater, Okla.

[73] Assignee: Viking Pump Inc., Cedar Falls, Iowa

[21] Appl. No.: 231,960

[22] Filed: Aug. 15, 1988

[51] Int. Cl.$^5$ .......................... G05B 13/04; G01F 7/00; F04B 49/00

[52] U.S. Cl. ..................................... 364/149; 364/194; 364/510; 364/148; 417/18

[58] Field of Search .............................. 364/148–151, 364/152, 153, 157, 158, 159, 164, 176, 513, 578, 160, 161, 162, 163, 164, 165, 509, 194, 510; 73/861.53, 53, 3; 415/18, 26; 417/15, 18–24, 43, 85

[56] References Cited

U.S. PATENT DOCUMENTS

| 4,332,527 | 6/1982 | Moldovan et al. | 415/123 |
| 4,549,426 | 10/1985 | Erickson | 73/3 |
| 4,577,270 | 3/1986 | Sugano et al. | 364/164 |
| 4,657,529 | 4/1987 | Prince et al. | 604/66 |
| 4,726,219 | 2/1988 | Pearson et al. | 73/53 |
| 4,790,194 | 12/1988 | Bellows et al. | 73/861.53 |
| 4,791,548 | 12/1988 | Yoshikawa et al. | 364/149 |
| 4,814,968 | 3/1989 | Fukumoto | 364/150 |

OTHER PUBLICATIONS

Terminal Intelligence for Computer Controlled Actuators, by I. T. Hong, T. Ito, E. C. Fitch at the Spring National Design Engineering Show & Conference at McCormick Place, Chicago, IL on Mar. 24, 27, 1986.

Primary Examiner—Jerry Smith
Assistant Examiner—Jim Trammell
Attorney, Agent, or Firm—Hill, Van Santen, Steadman & Simpson

[57] ABSTRACT

An element which serves as the terminal or end point for a control system which uses a controllable plant to interface the environment, the plant is controlled by an actuating signal generated within the terminal element by three distinct algorithmic process; a real time plant simulator, a true-to-life output adjuster and a control signal processor.

21 Claims, 6 Drawing Sheets

TERMINAL ELEMENT

BACKGROUND OF THE INVENTION

1. Field of the Invention

This invention relates to an element that serves as the terminal or end point for a control system. Such element uses a controllable plant to interface with the environment and accomplish the job function. The plant is controlled by an actuating signal which is generated within the terminal element by three distinct algorithmic processes: a real time plant output simulator, a true-to-life output adjustor, and a control signal processor. The output simulator and the output adjustor yield a comparative plant output signal that is compared with the desired plant output signal to obtain an error signal which the control signal processor uses to establish the actuating signal for the controllable plant.

The comparative plant output signal approach of the invention is unique because it utilizes available, readily measurable physical operating parameters of the actual controllable plant and the operating environment by using real time plant simulation and output adjustment algorithms to accurately represent the plant's actual output which may be a signal that is often impossible to obtain physically, practically, or economically. A terminal element does not need or use the actual plant output for control or for other purposes. The output from the real time plant simulator is modified by a hierarchical adjustment algorithm to accurately represent the actual plant output (referred to herein as the comparative plant output signal) and to account for changes in the normal operating parameters (NOP), the environmental forcing parameters (EFP), the symptomatic or diagnostics monitoring parameters (SMP), and the calibration adjustment parameters (CAP).

The controller for a terminal element uses the tracking error (the real time difference between the desired plant output signal and the comparative plant output signal) to generate a plant actuating or control signal for regulating the output of the plant. The controller can use simple feedback control, optimal control, adaptive control, or learning control. Each terminal element of a machine system may have a high degree of intelligence and various control functions for the machine can be distributed and complex system transfer functions can be avoided. The calculation requirement of system computers can thus be drastically reduced.

2. Description of the Prior Art

Control is a technique of manipulating the input signals to a process plant so that the plant's output variables will yield a desired result. In general, there are two basic types of control systems: open loop control and closed loop control (a feedback system). In open loop control, the control is accomplished without any knowledge of the current state of the outputs. This system assumes that the plant operates without external disturbances which would cause the outputs of the plant to vary from those of a deterministic plant model established with pre-set coefficients. This type of control is inaccurate and is almost useless in practice because major disturbances exist in almost all processes.

In closed loop control systems, the actual values of the output parameters which are being controlled are fed back and compared with the desired output values to produce a "tracking error(s)" at any time during the plant control process. This type of control drives the tracking error(s) to zero when the plant's actual output agrees with the desired output state. In hierarchy, a closed loop control consists of four levels of evolution, depending on the sophistication and completeness of the control algorithms applied: (1) simple feedback control, (2) optimal control, (3) adaptive control, and (4) learning control.

Basically, a simple feedback control system comprises a controller which responds to the tracking error and manipulates the error according to a given plant transfer function. This action generates a plant control signal for regulating the outputs of a plant to a desired state. The control law used is simply an I/O (input/output) dynamic mapping so as to nullify the tracking error. The transfer function of the plant must be fully describable and constant.

An optimal control system is similar to a simple feedback control system, except the optimal controller manipulates the control process according to a "performance index" defined by the user. A performance index is a functional relationship which involves system state variables and control inputs such that the optimum operating conditions may be determined. It normally uses the minimum variance principles. There are numerous types of optimal controllers used in applications; typical examples include the following: (1) a minimum time control in which the final state is reached in the shortest possible period of time, (2) a minimum energy control so as to transfer the system from an initial state to a final state with a minimum expenditure of control energy, and (3) the wellknown PID (proportional-integral-derivative) controller which drives a system to match a desired dynamic characteristic by optimally setting the PID feedback gains Unlike a simple feedback control system or an optimal control system, an adaptive control system is designed so as to modify its control law as the system operating conditions change so that the performance is always optimal. Therefore, for an adaptive system, the plant input/output state variables must be continuously available. In other words, an adaptive control system required an identification process so as to determine the I/O state variables in real time. Furthermore, the performance index must be continuously calculated and the optimal control law changed to fit the new requirement. Consequently, an adaptive controller combines both system identification and control design in order to be self-tuning; however, it requires a complicated design and a fairly time-consuming control process. In fact, one of the major advantages of using adaptive control is the ability to overcome the tuning problem frequently encountered in feedback control applications which result from varying system operating conditions and external effects occuring during a control process.

A learning control System is designed so as to recognize familiar features and patterns of a situation and then, based on its past experience or learned behaviour, to react in an optimum manner. More specifically, a learning controller, if subjected to a new environment, learns how to react to that environment by adapting the control law. Nevertheless, if the system again experiences the environment it has previously learned, it will recognize the environment and change the control law as it did in the previous case rather than operate as an adaptive controller which requires that the system perform system identification, parameter estimation, and the proper control law for each control step regardless of past experiences. That is, a learning controller can avoid the time-consuming calculation of the adaptive control signal if the calculation is deemed unnecessary.

The Conference paper entitled "Terminal Intelligence For Computer Controlled Actuators" by I. T. Hong, T. Ito and E. C. Fitch at the Spring National Design Engineering Show and Conference at McCormick Place, Chicago, Ill. on Mar. 24,-27, 1986 discusses some of these problems.

It is to be noted that in a typical closed loop control, regardless of whether it is deterministic or adaptive, the controller requires a tracking error (obtained by comparing the desired output and the actual parameter values which are being controlled) for determining the plant control signal necessary so as to achieve a desired task. In theory, the plant's primary output parameters which are being controlled can be obtained under any condition. In practice, however, the primary output parameters are frequently not measurable or are very difficult to measure because of application restrictions, instrumentation problems, or safety-related problems. Hence, difficulties in obtaining the primary outputs can drastically handicap the practical application of closed loop control systems.

Accordingly, there is a need for a controller that can use the secondary output parameters which are measurable parameters other than the primary outputs from the plant so as to accomplish a desired control objective. Moreover, it is desirable that each controllable element in the system possess its own characteristic algorithm which may respond to the secondary outputs and to generate control signals accordingly. In such a case, system control is distributed to each element and thus avoids forming a complicated system transfer function that would increase the control's mathematical complexity and the calculation burden which are highly undesirable when control speed is important.

SUMMARY OF THE INVENTION

In this invention, the above mentioned limitations of prior art control techniques are overcome by using, a terminal element (TE) which includes a controllable plant, a theoretical real time plant simulator, a true-to-life output adjustor, and a control processor. The controllable plant consists of a controller with a plant which is to be controlled and which has an output which is responsive to a control or an actuating signal that reflects the desired output signal, the state of the output as produced by the real time plant output simulator and as modified by the output adjustment algorithm, and the control law which is being applied by the control processor.

The real time plant output simulator generates a simulated plant output by using the secondary output parameters from the plant and the performance model built in the simulator. The simulated output is modified by the true-to-life output adjustor by using an adjustment algorithm so as to account for changes in the normal operating parameters (NOP), the environmental forcing parameters (EFP), the symptomatic or diagnostics monitoring parameters (SMP), and the calibration adjustment parameters (CAP).

The NOP adjusts the simulated outputs by an amount which represents the performance drift or shift of the original operating point from the current one due to variations of the operating parameters under normal conditions. The EFP, on the other hand, generates an adjustment factor that accounts for the environmental factors which cause drift of the operating point. The SMP recognizes the trend of performance degradation as well as component/plant abnormalities. It then identifies the failure symptom and provides for adjustment in the simulated output so as to compensate for performance degradation and for abnormalities or produces an alarm signal if such compensation cannot be achieved. The CAP provides the output adjustor with information needed to reset a new reference operating point so that the NOP, EFP and SMP can operate as close as possible to the true operating point and therefore minimize the simulation errors. Hence, each output adjustment factor (NOP, EFP, SMP, and CAP) contributes a unique function which is needed for precise tuning of the real-time simulated output. Thus, these factors help to achieve an accurate comparative output signal and so as to perform a complementary enhancement of the simulated output which is not achieved by any other factor which acts independently.

A TE can have any or all of its subsystems (real-time plant simulator, true-to-life output adjustor, and control processor) implemented internally or externally. When a TE its subsystems and the controllable plant are integrated together then it is capable of monitoring, diagnosing and executing the control process by itself based upon an initiation command. Consequently, when using TEs, the control responsibility is distributed to the end points of a system. As a result, a simpler and more efficient control and diagnostic approach are accomplished than that achieved by conventional lumped parameter control methods.

In a preferred embodiment of this invention, the terminal element is an integrated learning type which includes a controllable plant, a real time plant simulator, a true-to-life output adjustor and a learning controller. When the TE is set into operation, both the real time plant simulator and the output adjustor respond to the secondary output parameters of the actual plant and generate a comparative signal which has been obtained from the simulated output using NOP, EFP, SMP, and CAP inputs. The comparative plant output signal is then simultaneously fed with the desired output signal into the learning controller. The controller contains algorithms for learning control, system identification, parameter estimation and adaptive control that manipulate system information and provides a control signal to the controller of the controllable plant. Finally, the controller generates a plant input signal so as to drive the plant into the desired process state. This control process is continuously repeated until the TE receives a termination command.

On-chip hardware is used to accomplish the TE function described in the preferred embodiment. Basically, the hardware has all of the TE algorithms embedded and uses a unique time sharing operational technique to allocate CPU time for data acquisition, process TE algorithms, control command generation, and data logging.

The present invention primarily uses only measurable secondary outputs as feed back parameters for control so that it can be applied to a wide range of operating conditions especially when the primary output parameters are immeasurable, difficult or dangerous to measure. It also self-adjusts the simulated outputs with respect to NOP, EFP, SMP and CAP to compensate for performance degradation and for abnormalities due to operating and environmental effects. Moreover, the invention allows a TE to utilize control techniques that have different levels of intelligence and hence allows the control process to be optimized for a specific application.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure, and in which:

DESCRIPTION OF THE PREFERRED EMBODIMENTS

Figure 1:
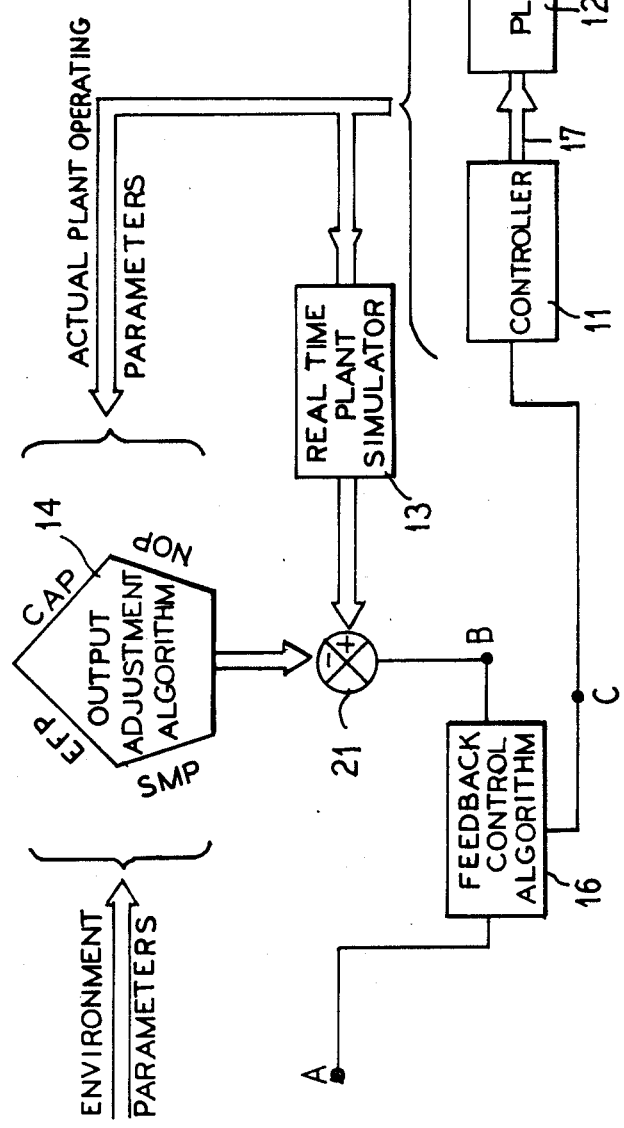
FIG. 1 is a block diagram of the invention.

A terminal element 10 of the invention is illustrated in FIG. 1 which includes four major subsystems: a controllable plant comprising the controller 11 and the plant 12, a real time plant simulator 13, a true-to-life output adjustor 14, and a control algorithm processor 16. The controllable plant is a physical subsystem, and its dynamic characteristic transfer function is embedded in the algorithm of the control processor being used. The plant 12 responds to the control signal 17 to generate process control parameters 18 such as, but not limited to, pressure, flow rate, temperature, position, rotational speed, torque, and pH value. The plant output parameters 19 include primary outputs (those that are being controlled and often are unmeasurable) and secondary outputs 18 (those that are measurable and useful for real time TE control in place of primary outputs).

The secondary output parameters 18 are obtained using sensors which are connected between the plant outputs and the TE's data acquisition module. The sensors convert the process parameters into various types of signals, such as current, voltage and frequency. The module changes these signals into codes (digital) or levels (analog) which are understood by both the real time plant simulator 13 and the output algorithm adjustor 16. Parameters of EFP, SMP and CAP are also fed into the TE through a data acquisition module. For a TE which uses digital control techniques, the sensed data are stored in a designated memory location after they have been digitized and are then ready for further data reduction and processing.

Figure 1C:
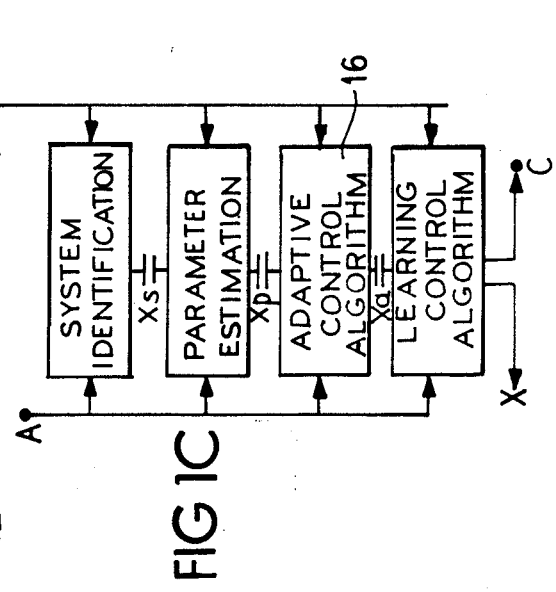
FIGS. 1A, 1B and 1C illustrate modifications of the invention.
Figure 1B:
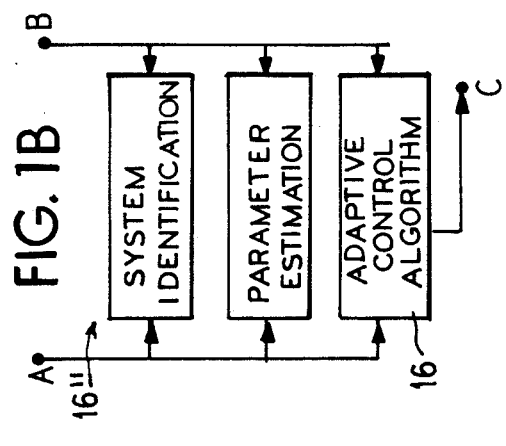
Figure 1A:
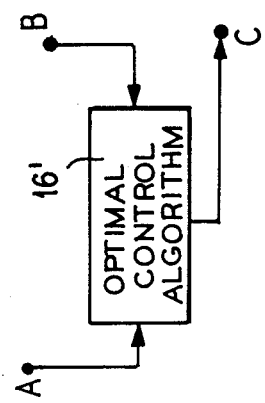

Data processing takes place in a single chip microcomputer according to the instruction codes (program) stored in a ROM (read only memory) or obtained from an EPROM (Erasable Programmable ROM). The program code algorithms for real time plant simulation, output adjustment, process control, data acquisition, and I/O interface are provided. To execute realtime control efficiently, the invention utilizes a Time Sharing Operating (TSO) module so as to allocate the central process unit (CPU) time between data acquisition and algorithmic calculations. The microcomputer interrupts the main algorithmic calculation whenever data acquisition is requested and it then resumes the calculation as soon as the data acquisition is over. The TSO also allows the user to set a desired sampling time interval, which is a significant factor in determining the stability of a digitally controlled process. An adder 21 combines the output of the real time plant simulator 13 with the output of the output adjustment algorithm 14 and supplies it to terminal B. A desired output signal is supplied to terminal A. Terminals A and B are respectively connected to the simple TE feedback control algorithm 16, or the optimal TE 16' shown in FIG. 1A, or the adaptive TE 16" shown in FIG. 1B or to the learning TE 16" shown in FIG. 1C.

When a TE is commanded to operate, the secondary outputs and environmental parameters are fed into the data acquisition module, digitized, and stored. Then the CPU performs the real time plant simulation using the stored plant operating model (either theoretical or empirical) and the secondary output values currently in the memory. Right after the plant simulation has been completed, the CPU calculates the adjustment needed using the output adjustment algorithm. The algorithm is a set of equations that describe the plant's performance degradation or variations due to the effects of NOP, EFP, SMP and CAP. As a result, the algorithm generates an output adjustment value which is compared with the simulated output value to establish a comparative output signal.

The control algorithm calculation is the next step after obtaining the comparative output signal. The CPU calculates the control signal according to the desired output values (which are set by the operator with the I/O interface module), the comparative output values, and the control algorithm being used. An integrated learning type TE includes a learning control module, an adaptive control module, a parameter estimation module, and a system identification module.

The learning control module (LCM) includes a reasoning sub-module to make control decisions based on past experience as recorded in a documentation (memory) sub-module. The LCM observes the real time system input (the desired output value) and generates output (the comparative output value) characteristics; then it consults the learned or given experience to set the control strategy in an optimum manner. It decides the necessity of using a system identification, a parameter estimation or an adaptive control module.

The system identification module (SIM) consists of an algorithm for determining the system dynamic order of the controllable plant. The "order" is an essential factor for postulating the theoretical structure of a dynamic system. The SIM extracts the real time system I/O information (desired output and comparative output) and manipulates extracted data either recursively or in batch to determine the order of a dynamic system. In general, a system's order may not change during a normal operating condition. Therefore, once the system's order has been identified, the SIM may be turned off until the LCM determines the necessity of re-identifying the order of the plant again.

The parameter estimation module (PEM) utilizes a procedure to characterize the unknown quantities (for example, the coefficients of the plant's transfer function) from measurements. The measurements are normally obtained from system input and output variables. They are the desired output values and the comparative output values in this invention. The PEM is capable of producing and updating parameter values on an on-line estimation basis. Normally, parameter estimation requires knowing the system, order which can be obtained from SIM or is self-generated by using PEM and an appropriate mathematical procedure.

The adaptive control module (ACM) essentially uses the updated system model and parameters from SIM and PEM to continuously adjust the control law so that the plant reacts or adapts itself to changes in its operation and environment. As a result, the ACM generates an actuating signal to drive the controllable plant in an optimal operating state. The actuating signal transmits through the output drive module (ODM) to the controllable plant.

The TE is also equipped with a control process status report function. Request is made using the enter keys of the I/O Interface Module (IOIM). Upon request, the monitor of IOIM displays the status information. Therefore, the IOIM allows the TE to be a fully self-tuning unit or to be capable of interacting with the operator. Moreover, a TE also possesses data logging and data historizing capability to provide the trend of condition-dependent parameters and thus performance degradation trends and system failure symptoms can be analyzed and predicted on a real time basis. The information on degradation trends and failure symptoms greatly compliments the function of the learning control module and the true-to-life output algorithm adjustor.

Figure 2:
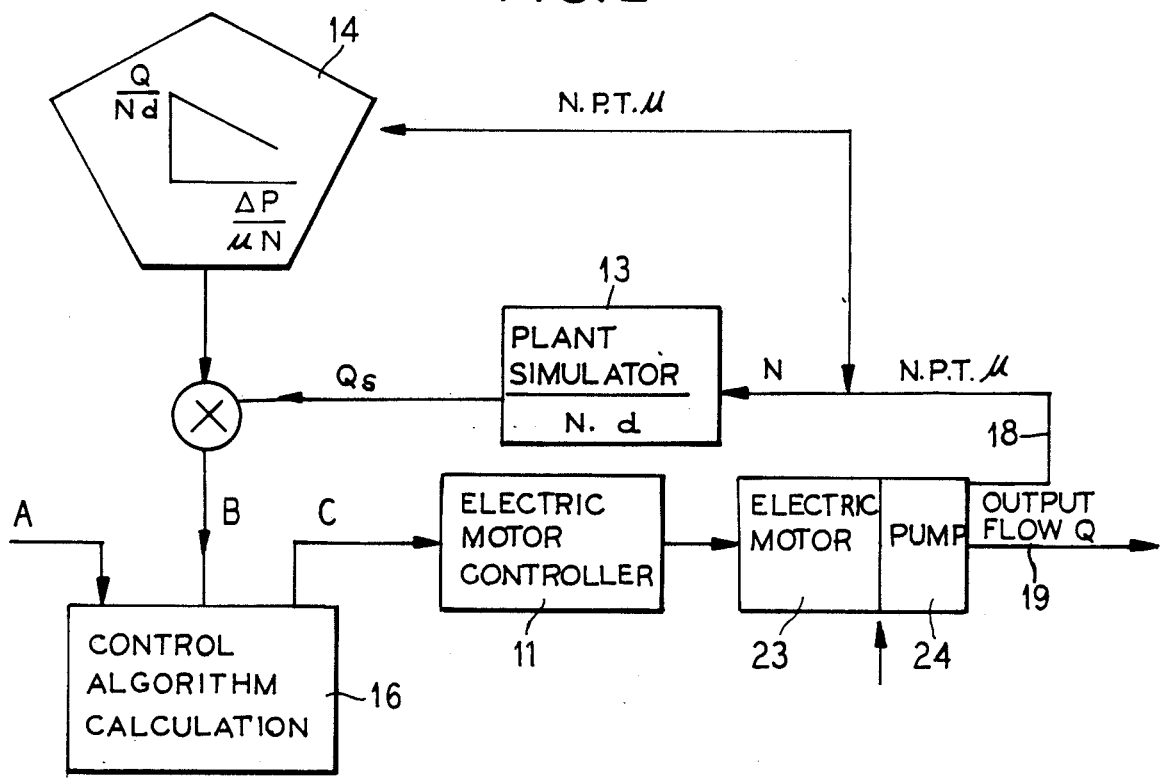
FIG. 2 is a block diagram of the invention.

One of TE's applications is for building a constant process flow pumping system as shown in FIG. 2. This system uses measurable parameters (pressure across pump, motor rotational speed, temperature, viscosity, etc.) other than the controlled parameter (output flow rate) to achieve control objectives. The terminology of TE presented earlier in this invention is now used to describe the function of the pump 24 being controlled.

The controlled plant 12, comprises a controller which is an electric motor controller 11. The plant is a fixed displacement process pump 24 which is driven by an electric motor 23. The plant output parameters are (a) primary: the pump output flow rate and (b) Secondary: motor RPM, pressure across pump, fluid viscosity, temperature, etc.

The plant simulator 13 produces a simulated output, Qs:

$$Qs = N \times d \quad (1)$$

where:
N is the RPM of the motor and
d is the pump displacement

Figure 3:
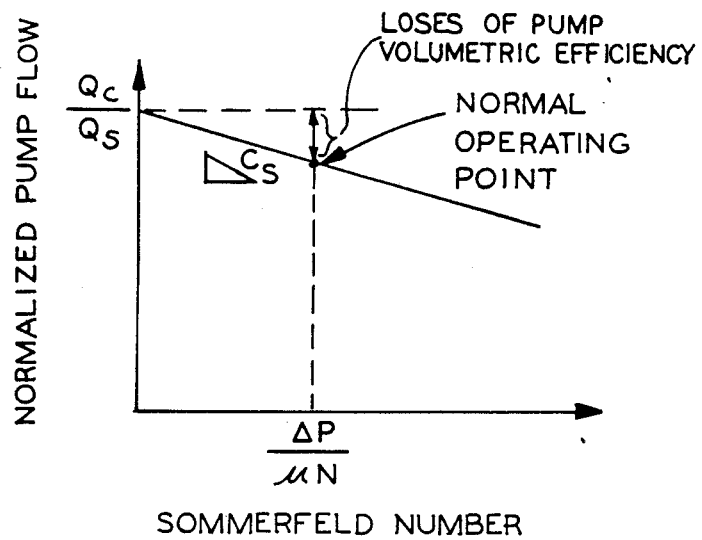
FIG. 3 is a graph of the normalized pump flow.

The output algorithm adjustor 14:
(a) NOP: Normal Operating Parameters, such as N, P, $\mu$, or T, define a normal operating point in terms of the Sommerfeld number and slip flow coefficient. For example, a linear model (See FIG. 3) has the following relationship:

$$\frac{Q_{al}}{Q_s} = C_s \frac{\Delta p}{\mu N} \quad (2)$$

Where $Q_{al}$ is the adjusted output flow of pump 24 due to the variation of NOP. Therefore, the comparative output with respect to NOP for this case is:

$$Q_c = Q_s - Q_{al} = Q_s \left(1 - C_s \frac{\Delta p}{\mu N}\right) \quad (3)$$

or $$\frac{Q_c}{Q_s} = 1 - C_s \frac{\Delta p}{\mu N} \quad (4)$$

where $Q_s$ is the theoretical flow, $C_s$ is the slip coefficient, $\Delta p$ is the pressure differential, and $\mu$ is the viscosity.

(b) EFP: Environmental Forcing Parameters include ambient temperature, external load disturbance, vibration, dust level, etc. The environmental parameter generates an adjustment factor that compensates for the environmental changes that would normally cause a drift to occur in the operating point.

Figure 4:
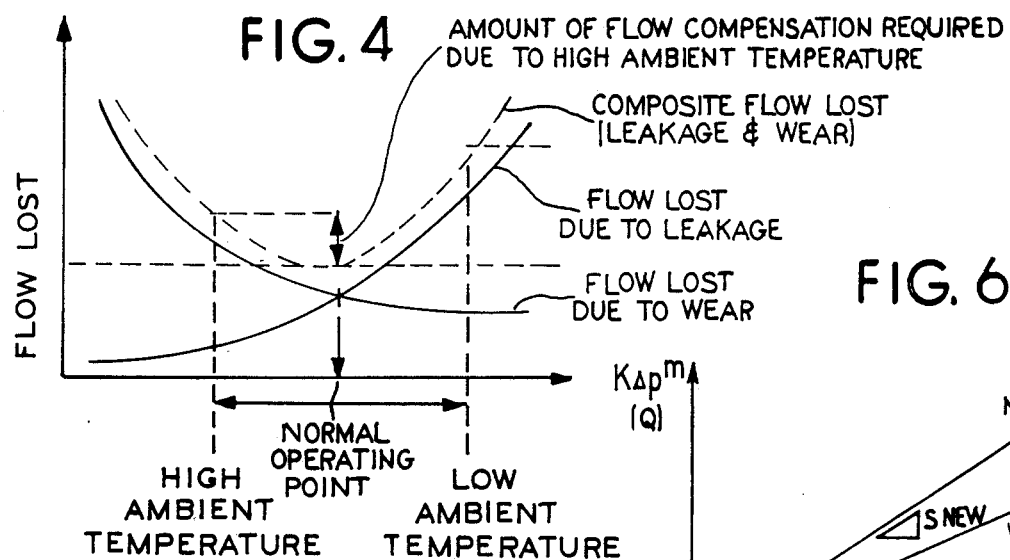
FIG. 4 is a graph which shows the effect of ambient temperature on flow lost.

FIG. 4 shows the ambient temperature effect on the tribological characteristics of the pump 24. Theoretically, the increase of ambient temperature will decrease both the mating clearance between the tribological surfaces and the viscosity of the working fluid. Due to the fact that flow lost (leakage) is proportional to the cubic of the clearance and is inversely proportional to the viscosity which is a function of temperature, therefore, the increase of temperature will decrease the leakage; however, the wear will be increased. Thus, ambient temperature variations will cause the pump to drift from the normal operating point and the pump experiences variations of flow lost due to wear and leakage. This lost flow must be compensated.

Figure 5:
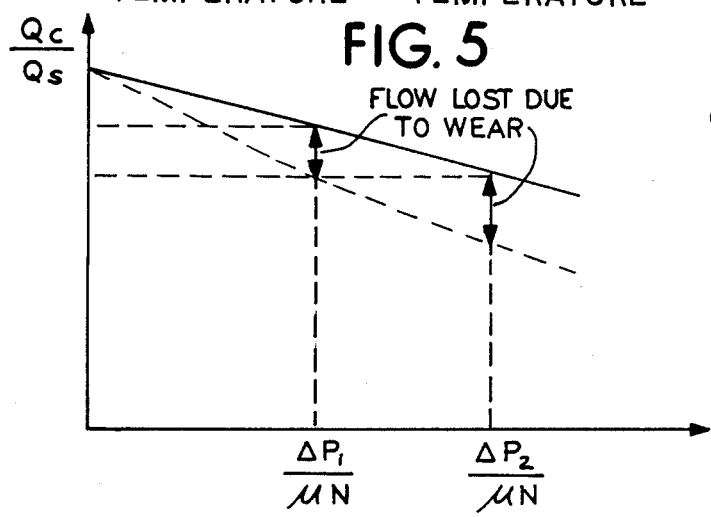
FIG. 5 is a graph for explaining the invention.

(c) SMP: Symptomatic Monitoring Parameters include such aspects as wear, noise, heat, and vibration. For example, under a wearing condition, the pump generates a low working pressure if all other normal operating parameters are maintained the same. When a TE detects such a symptom, it will adjust the pump's slip flow coefficient to compensate for the flow lost due to wear. FIG. 5 illustrates such a process. For a system having an orifice type resistance, the wear compensation flow is:

$$dQ_w = Q_s(C_s' - C_s) \frac{\Delta p}{\mu N} \quad (5)$$

where:

$$C_s' = \mu \left[ \frac{\sqrt{P_2} \, N_1 - \sqrt{P_1} \, N_2}{P_1 \sqrt{P_2} - \sqrt{P_1} \, P_2} \right] \quad (6)$$

$P_i$: pressure obtained at $N_i$ (d) CAP: Calibration Adjustment Parameters are used to calibrate a controllable plant after replacing a fluid or changing an element. Eq. (6) can be used to obtain the slip flow coefficient, $C_s$, of a pump under wearing condition.

Calibration of pump slip flow coefficient can also be obtained by correlating the operating pressures at various operating pump RPMs. The regression function of pressure to RPM has a general form of $$K_{66} \, P^m = A + S \cdot N \quad (7)$$

where

Figure 6:
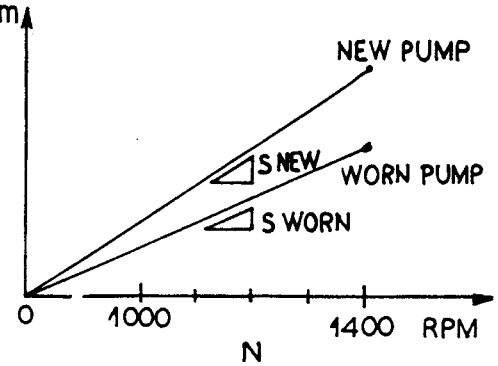
FIG. 6 is a graph for obtaining the slip flow coefficient, Cs.

K: a constant
m: an exponent,
 m = 1 for laminar flow
 m = 0.5 for turbulent flow
A: intersect value of the regression line, theoretically, it is zero.
S: slope of the regressing line FIG. 6 illustrates the characteristic lines of Eq. (7) for a pump at new and worn conditions respectively. Combining pumping theory (Eqs. (1) and (4)) and Eq. (7) gives $$C_s \text{ worn} = \frac{\mu}{pd}\left(Nd - \frac{Q_{new} \times S_{worn}}{S_{new}}\right) \quad (8)$$

where
Csworn (new): slip flow coefficient when the pump is worn (new);
Qnew: flow rate reading when pump is new.

Figure 7:
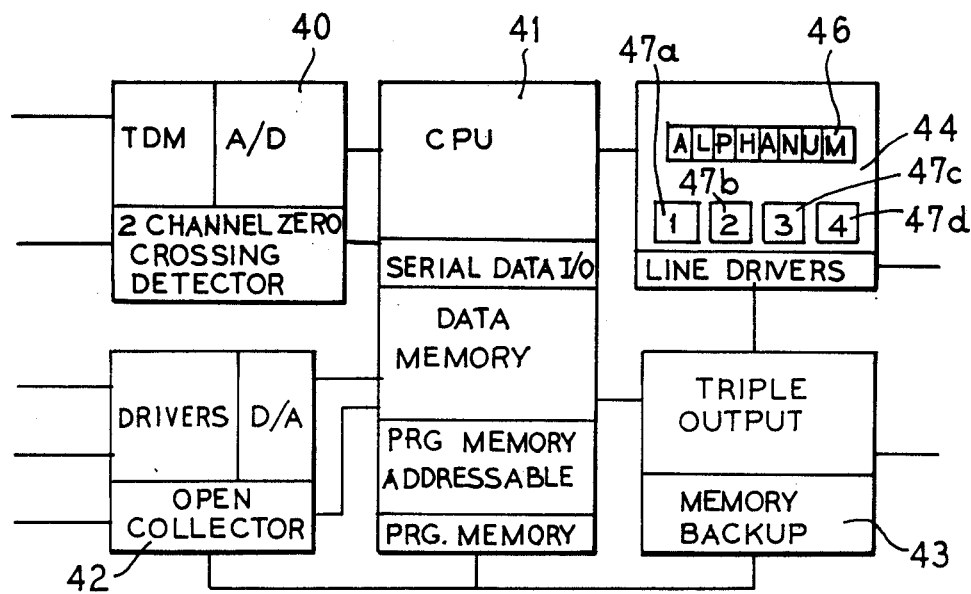
FIG. 7 is a block diagram of the invention.
Figure 8:
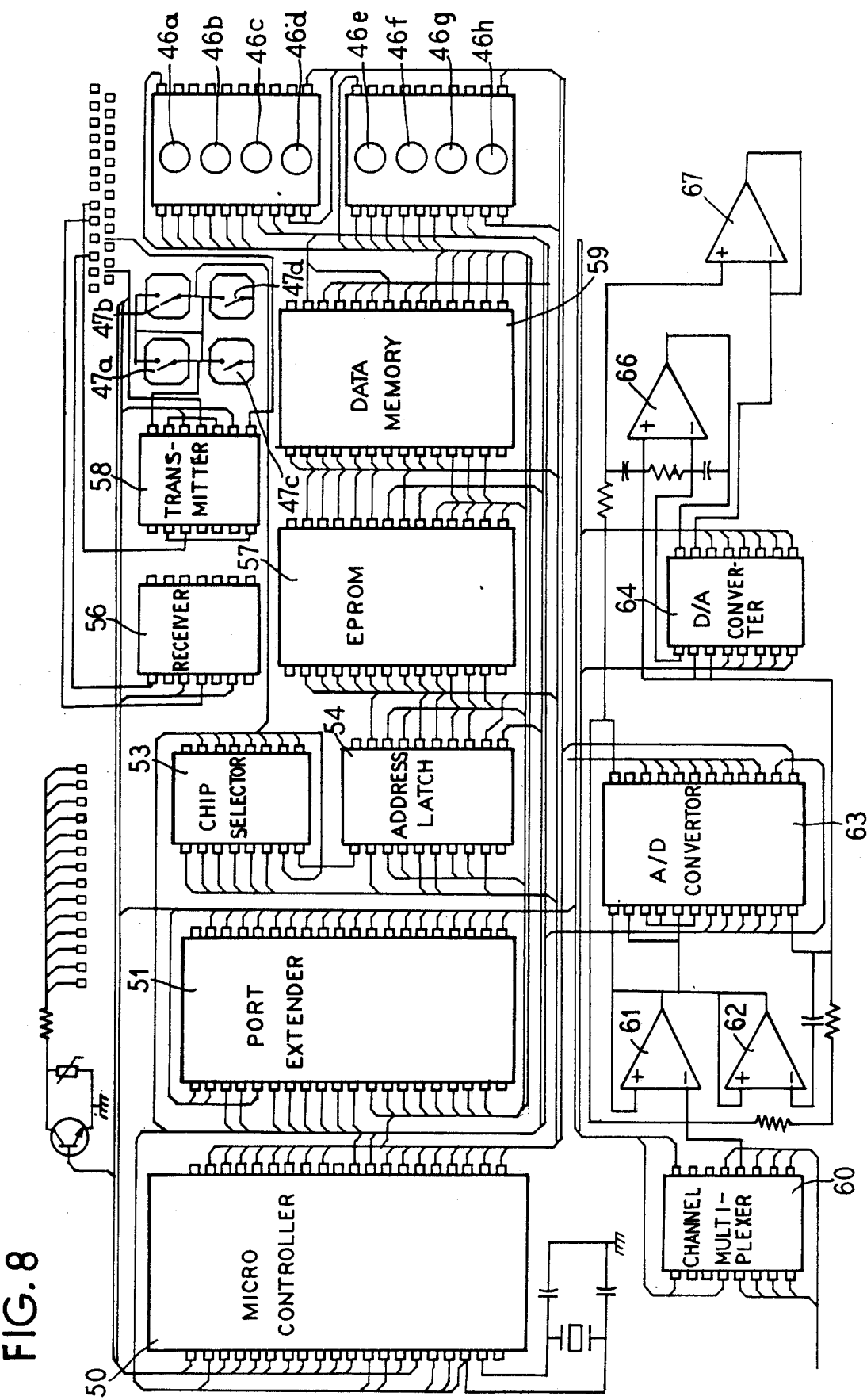
FIG. 8. is a layout diagram of the invention.

An on-Chip Microcontroller is one preferred version of a microcontroller which performs a TE's function, as shown in FIGS. 7 and 8. FIG. 7 illustrates the functional block diagram of a TE controller, and FIG. 8 shows the electronic hardware configuration. A TE controller basically contains five major units:
*The Transducer Input 40 (Data Acquisition)
*The Data Processing 41
*The User Interface 44
*The Power Supply 43
*The Control Output 42

The transducer input unit (TIU) 40 contains a multichannel multiplexer that directs the analog input signals (secondary parameters) converter. It also includes zero crossing detectors for frequency type signal acquisition. The TIU generates an external interrupt signal to the controller at the end of A/D conversion.

The data processing unit (DPU) 41 consists of a single chip micro computer 50 which may be an Intel 8052 for example, and the environment needed to execute the application program. The manipulation of comparative output signal and the control algorithm calculation are done using the machine code stored in EPROMS or ROM. Accordingly, a control signal is sent through the control unit to the plant controller 11 (FIG. 2). In some cases, output signal amplification may be required.

The DPU also allows system configuration and interrogation through the full duplex serial I/O channel. Further, the data memory is available for data logging and the proper procedure can be called from the application program (in EPROMS) for data analysis.

Figure 9:
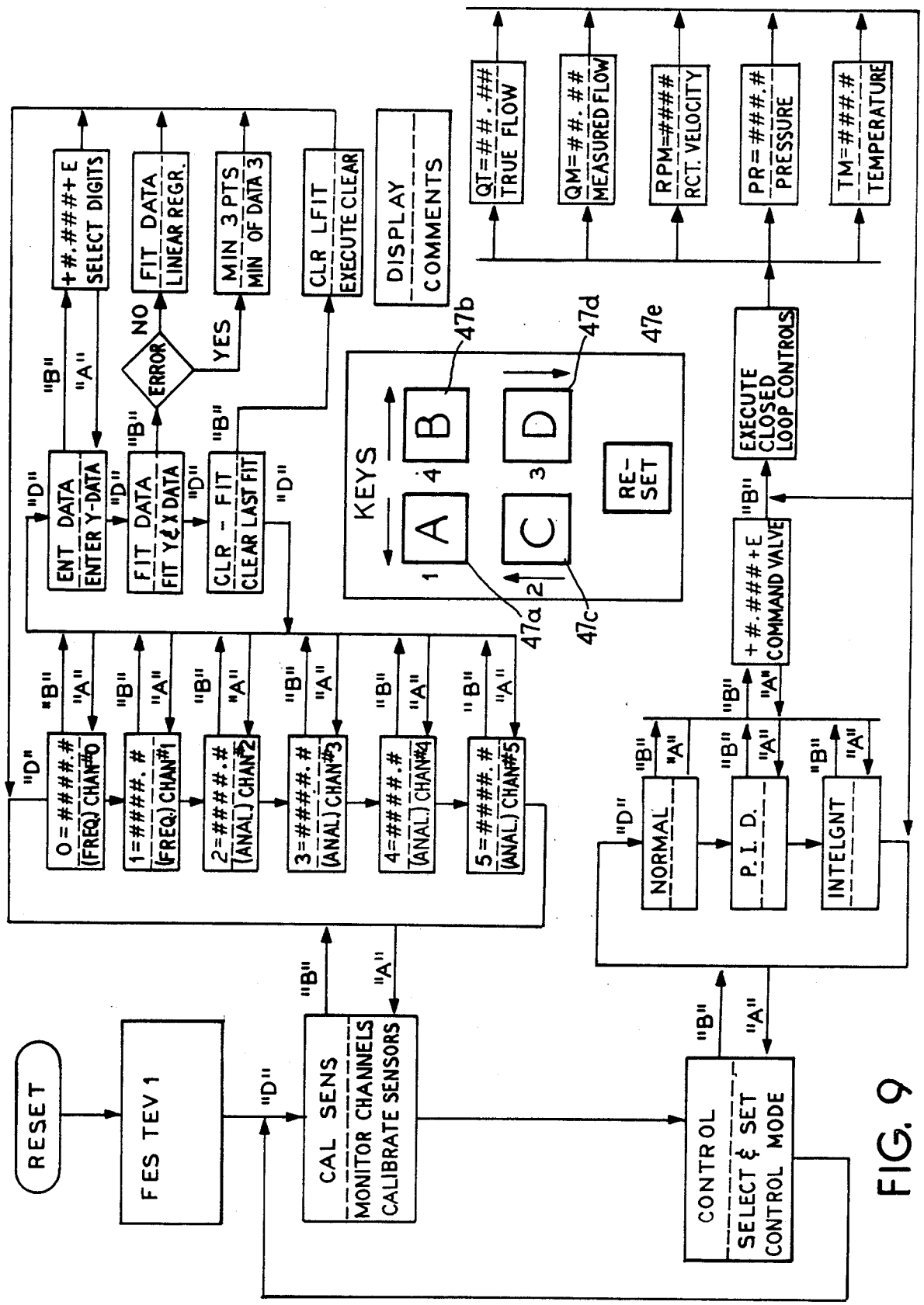
FIG. 9 is a flow diagram.

The user interface unit (UIU) 44 allows the user to enter the execution commands and to access the data. It displays control information at the user's request. In this example, the UIU's configuration has an 8 alphanumerical digits LED display 46 and 4 membrane switches 47a–47d and a reset switch 47e. FIG. 9 depicts the "road map" the UIU uses to do sensors calibration, to set the control mode and the desired control state, and to monitor the control status.

The CPU may be a type 8052 Intel Micro controller 50 which is connected to a type 8155 port extender 51. A chip selector 53 may be a type 74138 and an address latch 54 may be a type 74373. A receiver 56 may be a type 1489 and an EPROM 57 may be a type PD27256. A transmitter 58 may be a type 1488. The key pads 47a, 47b, 47c and 47d are shown. The LED alphanumerical indicators 46a–h are illustrated and may be type NSM1416. A data memory 59 may be a type PD43256. A channel multiplexer 60 may be a type 7501. Two type LM357 modules 61 and 62 are connected to an A/D converter 63 type AD757a. A D/A converter 64 type DAC1022 is connected to a type LM357 module 66 and to a type LM347 module 67.

The power supply unit 43 provides actuation voltages for the transducers used in the system. It also provides the power to retain program codes and data in memory during the power-down periods. Thus, data logging and learning control functions are possible.

The control output unit (COU) 42 provides analog signals (e.g., 0 to 5 volt or 4 to 20 MA) and digital signals (e.g., B.C.D.) to the plant controller according to the control command from the DPU. The analog control section includes D/A (digital to analog) converters and drivers. The digital control signal is simply an open collector.

FIG. 9 is a flow diagram.

Figure 10:
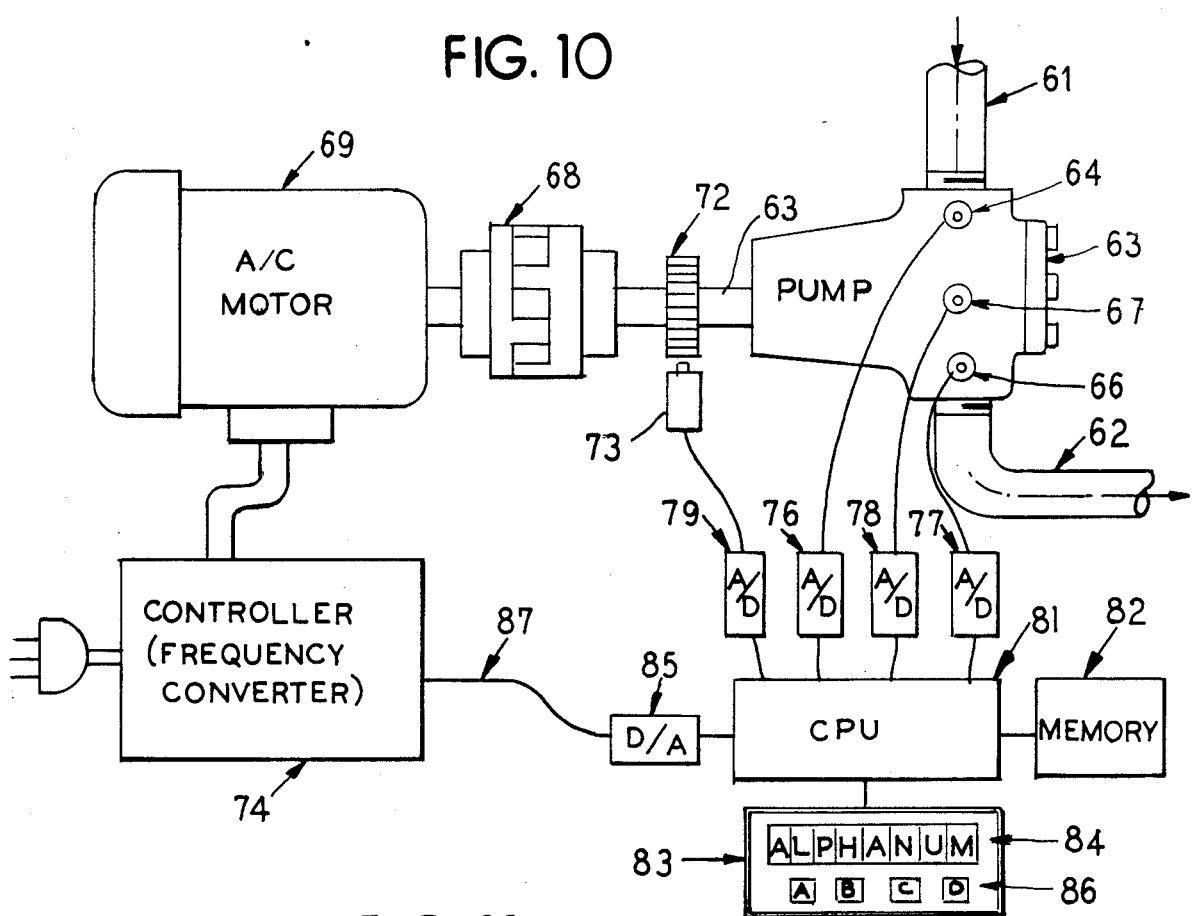
FIG. 10 illustrates a pump control system of the invention.

So as to illustrate a specific embodiment and the solution according to the invention, reference should be made to FIG. 10 wherein a fluid having a viscosity $\mu$ is flowing through a pipe which has input portion 61 that connects to a positive displacement pump 63 which might, for example, be a Viking pump type number HL-195 and which has its output connected to an output pipe 62. A pressure transducer 64 is connected into the input port of the pump 63 to measure input pressure and an output pressure transducer 66 is mounted in the output port of the pump to monitor the output pressure. A thermocouple or other temperature sensing device 67 is mounted in the pump 63 to monitor temperature.

The input shaft of the pump 63 is connected through a suitable coupling 68 to a suitable motor 69 which drives the pump. An RPM sensor may comprise a magnetic type RPM sensor which includes a rotating sector device 72 and a pickup 73 which produces electrical output.

A motor controller 74 supplies an electrical output to control the speed of the motor 69.

Analog to digital converters 76, 77, 78 and 79 respectively, receive the outputs of the pressure transducers 64, 66, the thermal couple 67 and the RPM pick-up 73 and supply outputs to the CPU 81. CPU 81 is connected to a suitable memory 82 and to a suitable input indicator unit 83 which has an indicator portion 84 and control buttons 86 for putting in suitable inputs to the microprocessor. The microprocessor 81 supplies an output on lead 87 through the digital to analog converter 85 to the motor controller 74 to control the speed of the motor 69 and the pump 63.

Figure 11:
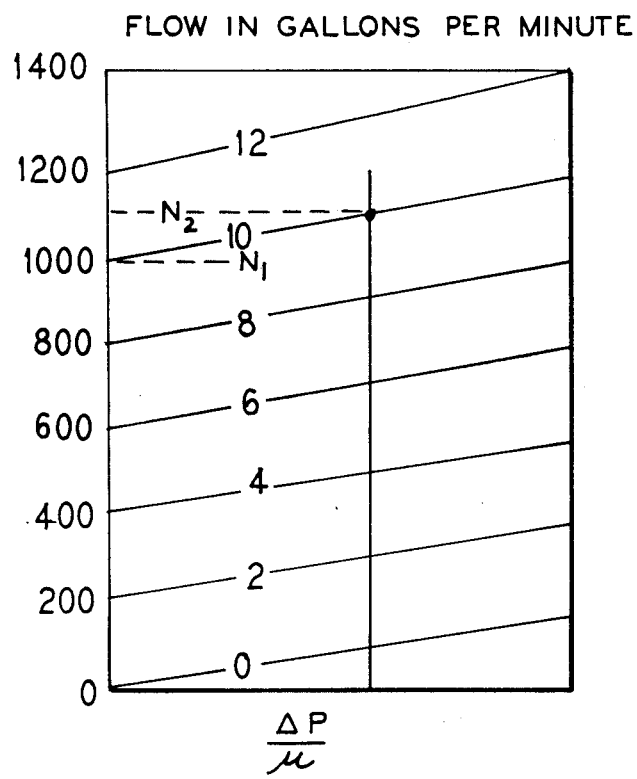
FIG. 11 is a graph of fluid flow.

FIG. 11 is a plot of motor-pump speed for different flow rates and for different ratios of differential pressure to viscosity.

The actual quantity of fluid delivered is equal to the theoretical quantity $Q_t$ minus the quantity that is lost due to slip. This can be expressed by the equation $Q_A = Q_T - Q_S$ where A represents actual, T represents theoretical and S represents the slip. This equation can be read as $Q_A = D \times N - C_S \times D \times \Delta p/\mu$ where D is the displacement of the fixed displacement pump, N is the RPM of the pump, $C_S$ is the slip coefficient, $\Delta P$ is the differential pressure across the pump and $\mu$ is the viscosity of the fluid.

Thus, in a specific example, if an operator desires to have a fluid flow of 10 gallons per minute, he sets such information in using the keyboard 86 in the input unit 83 illustrated in FIG. 10 and the CPU 81 initially produces an output signal on bus 87 to the motor controller 74 so as to drive the motor 69 to the theoretical RPM $N_1 = D/Q_a$ required for ten gallons per minute, in this example 1000 rpm. Initially, the CPU 81 assumes zero slip. As soon as the motor 69 starts driving the pump then feedback signals will be supplied from the pressure transducers 64 and 66, the thermocouple 67, the RPM sensor 73 and then the CPU 81 will calculate a revised speed ($N_2$) according to the formula $$N = \frac{Q_a}{D} + C_s \times \frac{\Delta p}{\mu}$$

Then the motor will be driven at a speed ($N_2$) greater than 1000 RPM as shown in the curve of FIG. 11 to compensate for slip. In this specification, fluid flow means either quantity or rate.

By continuing to monitor the above feedback signals, the CPU computes any changes in speed required due to variations in differential pressure and/or fluid viscosity and will send appropriate speed signals to the motor controller.

The program for the CPU 81 is attached.

Although the invention has been described with respect to preferred embodiments, it is not to be so limited as changes and modifications can be made which are within the full intended scope of the invention as defined by the appended claims.

```
PROGRAM E;
{$I UTIL1.ENI }
{$I FONT.ENI }
{$I GRAFPAK.ENI }
{$I QCKPLT.ENI }
TYPE CQVA=ARRAY[1..10,1..10] OF REAL;KCAHPZ=ARRAY[1..10] OF REAL;NFAKEX=ARRAY[0..2000] OF INTEGER;
AIUIZ=ARRAY[0..500] OF INTEGER;LABEL GLXPQ;VAR WK,XKYIQ,GZJOGY,TEX,DEQGTZ,SD,NIYV,US,VRW,FKXSVU,ZM,
KGTD,ZSIE,OJCM,DVGJZU,HUFOM,NHKOSA,JYY,XHQH,NOUM,RVVHO,GN,DAQ,AHN,VO,SRLSM,UTDJI,CEJJPV,GWC,NQNLTI
YZTCBN,OWO,XGYR,KUPYK,JJ,QHOBP,MHHHFR,XW:INTEGER;OB,TDXM,VAQ,LRM,ZHYN,PLVMLK,JXQOP:REAL;AFS,NOV,
IZNIRH,AHXAX:AIUIZ;SZ,AGZVZ:NFAKEX;GGYDQ,IUG:INTEGER;MLIFG,ABBZPR,VRO,YSOFVQ,XD,XJYAV,MGHED,UBHVCI:
REAL;EFUVM,TOHOAN,MIVCTY,SMZF,FWTC,YIML,MET,RRBS,JODK,LQEWRI,ZGYJFL,GCJAVQ,BSN,WNHPTP,NO:REAL;OCA
ARRAY[0..100] OF REAL;CQXW,BC:ARRAY[1..10] OF REAL;CATDSR,KJQ,WZX:KCAHPZ;DSG,AMNGH,UFIG,DJFE,IBGJJ,
GWQK,TZJVFI:INTEGER;LRZSYQ,POMELB:CQVA;WBPXSY,YIXZ,NCY,LBNWM:CAXIP;ZHNN:CHAR;BWVK,QX:INTEGER;FNH
TEXT;PROCEDURE RW(VAR WK:INTEGER);EXTERNAL'ADAPTP.COM';PROCEDURE JTFGT(VAR XKYIQ,GELZYH:INTEGER
EXTERNAL RW[48];PROCEDURE UYB(VAR LAHXUV,FWY,DAL,IKX,JZXO,KSV:INTEGER);EXTERNAL RW[42];PROCEDURE KJ
(VAR DEQGTZ,SD,NIYV:INTEGER);EXTERNAL RW[53];PROCEDURE QGDYA;BEGIN CLRSCR;WK:=768;RW(WK);TEX:=16000;
XKYIQ:=1;GZJOGY:=ROUND(1193210.0/TEX-4) DIV 2;WRITELN('TRIG=',XKYIQ,' TVALUE=',GZJOGY);DEQGTZ:=2;SD
:=1;NIYV:=0;GGYDQ:=4095;IUG:=0;KJX(DEQGTZ,SD,NIYV);VRW:=13;FKXSVU:=32;ZM:=1;KGTD:=1000;ZSIE:=1;OJCM
:=2;DVGJZU:=128;HUFOM:=0;NHKOSA:=1000;JYY:=1;XHQH:=3;NOUM:=64;RVVHO:=0;GN:=2000;DAQ:=1;AHN:=4;VO:=128
;SRLSM:=0;UTDJI:=2000;CEJJPV:=1;GWC:=6;NQNLTI:=1;YZTCBN:=0;OWO:=100;XGYR:=1;KUPYK:=7;JJ:=1;QHOBP:=0;
MHHHFR:=100;XW:=1;VRO:=0.5;YSOFVQ:=0.5;XD:=0;MLIFG:=0;XJYAV:=0;MGHED:=0;UBHVCI:=0;END;PROCEDURE HHYJ
(MX:INTEGER;ZERH:NFAKEX;VAR JGFL:REAL);VAR ZZVQU,VGRVC,GWQK:INTEGER;OEXFQ:NFAKEX;BEGIN ZZVQU:=0;
VGRVC:=0;FOR GWQK:=1 TO MX DO BEGIN OEXFQ[GWQK]:=0;END;FOR GWQK:=0 TO (MX-1) DO BEGIN IF (ZERH[GWQK]
<0) AND (ZERH[GWQK+1]>=0) THEN ZZVQU:=ZZVQU+1;OEXFQ[ZZVQU]:=OEXFQ[ZZVQU]+1;END;FOR GWQK:=1 TO (ZZVQ
-1) DO BEGIN VGRVC:=VGRVC+OEXFQ[GWQK];END;JGFL:=(ZZVQU-1)/(3.70e-5*(VGRVC+1));END;PROCEDURE ASP;
BEGIN GOTOXY(15,8);WRITE('>> Enter the desired flow rate (GPM) [0..30]:');READLN(JXQOP);END;
PROCEDURE AHHKC(UZF:REAL);BEGIN US:=ROUND(UZF);IF US>GGYDQ THEN US:=GGYDQ;IF US<IUG THEN US:=IUG;KJ
(DEQGTZ,SD,US);END;PROCEDURE MEAQD(MX:INTEGER;ZERH:AIUIZ;VAR HTDZ:REAL);VAR GWQK:INTEGER;BEGIN HTD
:=0;FOR GWQK:=0 TO (MX-1) DO BEGIN HTDZ:=HTDZ+ZERH[GWQK];END;HTDZ:=HTDZ/MX;HTDZ:=0.2702*HTDZ+5.17;
END;PROCEDURE FCRPLS(MX:INTEGER;ZERH:AIUIZ;VAR ZIGG:REAL);VAR GWQK:INTEGER;BEGIN ZIGG:=0;FOR GWQK:=
TO (MX-1) DO BEGIN ZIGG:=ZIGG+ZERH[GWQK];END;ZIGG:=ZIGG/MX;ZIGG:=62.0+(ZIGG-1256.0)/3.64615;END;
PROCEDURE ZJ(HPLHEW,MRLAD,VATX:REAL;VAR OVS:REAL);BEGIN OVS:=(VATX*YML)-(FWTC*MRLAD*YML/MET);EN
PROCEDURE LJ(PEFU:REAL;VAR YMY:REAL);VAR QKUHY,CQXW,BC,PQTHGZ:REAL;BEGIN PQTHGZ:=PEFU/MET;IF PQTH
<=15 THEN BEGIN CQXW:=1458.2550;BC:=46.999172;END;IF (PQTHGZ>15) AND (PQTHGZ<=150) THEN BEGIN CQXW:=1673.2
;BC:=-30.456472;END;IF PQTHGZ>150 THEN BEGIN CQXW:=1519.0;BC:=0;END;IF PQTHGZ<=0 THEN PQTHGZ:=0.1;
QKUHY:=CQXW+BC*LN(PQTHGZ);YMY:=(PEFU*60/QKUHY);END;PROCEDURE MHAW(HPLHEW,RRBS,JODK,LQEWRI:REAL
MET:REAL);BEGIN MET:=RRBS*(EXP(JODK*(HPLHEW-LQEWRI)));END;PROCEDURE VDWAP(EVXPZQ,MIVCTY:REAL;VAR
DLJT:REAL);VAR JN:REAL;BEGIN XJYAV:=EVXPZQ-MIVCTY;JN:=VRO*(XJYAV-MGHED)+YSOFVQ*XJYAV+XD*(XJYAV-2*
MGHED+UBHVCI);DLJT:=DLJT+JN;MGHED:=XJYAV;UBHVCI:=MGHED;END;PROCEDURE WT(EVXPZQ,MIVCTY:REAL;VAR
REAL);VAR JN:REAL;BEGIN XJYAV:=EVXPZQ-MIVCTY;IF ABS(TOHOAN)>0.05 THEN BEGIN POMELB[1,1]:=0.5;POMELB[1
,2]:=1;END;JN:=(XJYAV-POMELB[1,1]*MGHED)/POMELB[2,1];DLJT:=MIVCTY+JN;MGHED:=XJYAV;END;PROCEDURE HAN(
TKJC,ZXA:CQVA;BR,FNHZI,ARD:INTEGER;VAR KYO:CQVA);VAR GWQK,IBGJJ,AMNGH:INTEGER;IHUMOI:REAL;BEGIN FOR
GWQK:=1 TO BR DO BEGIN FOR IBGJJ:=1 TO ARD DO BEGIN IHUMOI:=0.;FOR AMNGH:=1 TO FNHZI DO BEGIN IHUMOI
:=IHUMOI+TKJC[GWQK,AMNGH]*ZXA[AMNGH,IBGJJ];END;KYO[GWQK,IBGJJ]:=IHUMOI;END;END;END;PROCEDURE FB(KJ
WZX:KCAHPZ;VAR LRZSYQ,POMELB:CQVA;VAR TOHOAN:REAL);VAR ZZCMY,SEQUO:REAL;FR,OLA,GWQK,IBGJJ,AMNGH:
INTEGER;LROM,LSRTDY,GQZZ,VE,KRZG,RQPJ,ESIGPJ:CQVA;BEGIN SEQUO:=1.0e-19;FR:=DJFE+1;OLA:=2*DJFE;ZZCMY
:=KJQ[FR];FOR GWQK:=1 TO DJFE DO BEGIN FOR IBGJJ:=1 TO 1 DO BEGIN LROM[GWQK,IBGJJ]:=-KJQ[FR-GWQK];
LROM[GWQK+DJFE,IBGJJ]:=WZX[FR-GWQK];END;END;FOR GWQK:=1 TO 1 DO BEGIN FOR IBGJJ:=1 TO OLA DO BEGIN
LSRTDY[GWQK,IBGJJ]:=LROM[IBGJJ,GWQK];END;END;HAN(LRZSYQ,LROM,OLA,OLA,1,GQZZ);HAN(LSRTDY,GQZZ,1,OLA,1
,VE);IF ABS(VE[1,1])>SEQUO THEN BEGIN HAN(LSRTDY,POMELB,1,OLA,1,KRZG);TOHOAN:=ZZCMY-KRZG[1,1];FOR
GWQK:=1 TO OLA DO BEGIN FOR IBGJJ:=1 TO 1 DO BEGIN POMELB[GWQK,IBGJJ]:=POMELB[GWQK,IBGJJ]+GQZZ[GWQK,
IBGJJ]*TOHOAN/VE[1,1];END;END;HAN(GQZZ,LSRTDY,OLA,1,OLA,RQPJ);HAN(RQPJ,LRZSYQ,OLA,OLA,OLA,ESIGPJ);
FOR GWQK:=1 TO OLA DO BEGIN FOR IBGJJ:=1 TO OLA DO BEGIN LRZSYQ[GWQK,IBGJJ]:=LRZSYQ[GWQK,IBGJJ]-(
ESIGPJ[GWQK,IBGJJ]/VE[1,1]);END;END;END;END;PROCEDURE BW;VAR GWQK,IBGJJ:INTEGER;FNHZI:TEXT;BEGIN
ASSIGN(FNHZI,'adout.dat');RESET(FNHZI);FOR GWQK:=1 TO DJFE DO BEGIN FOR IBGJJ:=1 TO 1 DO BEGIN
```

POMELB[GWQK,IBGJJ]:=0.0;POMELB[GWQK+DJFE,IBGJJ]:=0.0;END;END;FOR GWQK:=1 TO 2*DJFE DO BEGIN FOR IBGJJ:=1 TO 2*DJFE DO BEGIN IF GWQK=IBGJJ THEN LRZSYQ[GWQK,IBGJJ]:=1.0 ELSE LRZSYQ[GWQK,IBGJJ]:=0.0; END;END;FOR IBGJJ:=1 TO (DJFE+1) DO BEGIN KJQ[IBGJJ]:=0;WZX[IBGJJ]:=0;END;CLOSE(FNHZI);END; PROCEDURE VAMQ(VAR KJQ,WZX:KCAHPZ);VAR FR,AMNGH:INTEGER;BEGIN FR:=DJFE+1;FOR AMNGH:=DJFE DOWNTO DO BEGIN KJQ[FR-AMNGH]:=KJQ[FR-AMNGH+1];WZX[FR-AMNGH]:=WZX[FR-AMNGH+1];END;END;PROCEDURE UC(KJQ,W KCAHPZ;POMELB:CQVA;PXCFTY:REAL;VAR VERM:REAL);VAR BUPS,KTRH:REAL;AMNGH,FR:INTEGER;BEGIN BUPS:=0.; KTRH:=0.;FR:=DJFE+1;FOR AMNGH:=1 TO DJFE DO BEGIN BUPS:=BUPS+POMELB[AMNGH,1]*KJQ[FR-AMNGH+1];END; FOR AMNGH:=2 TO DJFE DO BEGIN KTRH:=KTRH+POMELB[AMNGH+DJFE,1]*WZX[FR-AMNGH+1];END;WZX[FR]:=(BUPS-KTRH+PXCFTY)/POMELB[FR,1];IF ABS(TOHOAN)>0.1 THEN WZX[FR]:=PXCFTY;VERM:=WZX[FR];END;PROCEDURE XLB; VAR BXKCEN:TEXT;BEGIN CLRSCR;WRITELN('coef. A ',' coef. B');WRITELN('---------- ----------');
FOR GWQK:=1 TO DJFE DO BEGIN FOR IBGJJ:=1 TO 1 DO BEGIN WRITELN(POMELB[GWQK,IBGJJ]:10,' ',POMELB[ GWQK+DJFE,IBGJJ]:10);END;END;WRITELN('YERROR=',TOHOAN:10);WRITELN('n_times=',UFIG:6);ASSIGN(BXKCEN, 'adout.dat');REWRITE(BXKCEN);FOR GWQK:=1 TO DJFE DO BEGIN FOR IBGJJ:=1 TO 1 DO BEGIN WRITELN(BXKCEN, POMELB[GWQK,IBGJJ]:10,' ',POMELB[GWQK+DJFE,IBGJJ]:10);END;END;CLOSE(BXKCEN);READ(KBD,ZHNN);END; PROCEDURE XTXQ;BEGIN ASSIGN(FNHZI,'pump.dat');RESET(FNHZI);READLN(FNHZI,QX,BWVK);READLN(FNHZI,YIML, FWTC,ZGYJFL,GCJAVQ);READLN(FNHZI,BSN,WNHPTP);READLN(FNHZI,RRBS,LQEWRI,JODK);READLN(FNHZI,VRO,YSOFV XD);CLOSE(FNHZI);END;PROCEDURE LEGJ;BEGIN VL(WBPXSY,YIXZ,UFIG,'Time (sec)$','Flow Rate (GPM)$', 'INTELLIGENT PUMP CONTROL$',25,'SET');VL(WBPXSY,NCY,UFIG,'$','$','$',24,'PUMP');VL(WBPXSY,LBNWM,UFIG ,'$','$','$',0,'METER');READ(KBD,ZHNN);RGJQ;END;PROCEDURE TGUF;BEGIN US:=0;KJX(DEQGTZ,SD,US);END; PROCEDURE SUAHNI;BEGIN GOTOXY(16,10);WRITELN;WRITELN('Temperature O Channel #1 =',ZHYN:8:1,' F'); WRITELN('Pressure O Channel #2 =',PLVMLK:8:2,' psi');WRITELN('Pump Speed O Channel #3 =',OB:8:1, ' RPM');WRITELN('Flow Meter Reading =',NO:8:2,' GPM');WRITELN('Flow Master Reading =', MLIFG:8:2,' GPM');WRITELN('signal value =',ABBZPR:8:2);END;BEGIN QGDYA;DJFE:=1;UFIG:=1; EFUVM:=1.0;BW;XTXQ;YIML:=YIML/231;ABBZPR:=0.0;GLXPQ: ASP;WRITELN(XKYIQ,' ',GZJOGY);JTFGT(XKYIQ, GZJOGY);UYB(GWC,NQNLTI,YZTCBN,OWO,XGYR,IZNIRH[0]);UYB(KUPYK,JJ,QHOBP,MHHHFR,XW,AHXAX[0]);CLRSCR; GOTOXY(45,3);WRITELN('Actuation Voltage',IZNIRH[10]:5,'/',AHXAX[10]:5);TZJVFI:=0;REPEAT UYB(VRW, FKXSVU,ZM,KGTD,ZSIE,AFS[0]);UYB(OJCM,DVGJZU,HUFOM,NHKOSA,JYY,NOV[0]);UYB(XHQH,NOUM,RVVHO,GN,DAQ,SZ[0 ]);UYB(AHN,VO,SRLSM,UTDJI,CEJJPV,AGZVZ[0]);HHYJ(GN,SZ,OB);HHYJ(UTDJI,AGZVZ,TDXM);MEAQD(NHKOSA,NOV, PLVMLK);FCRPLS(KGTD,AFS,ZHYN);MHAW(ZHYN,RRBS,JODK,LQEWRI,MET);ZJ(ZHYN,PLVMLK,OB,MLIFG);LJ(TDXM,NO); IF NO>30.0 THEN NO:=0.0;IF UFIG=1 THEN BEGIN PLVMLK:=0;OB:=0;TDXM:=0;MLIFG:=0;WBPXSY[1]:=0.0;YIXZ[1] :=0.0;NCY[1]:=0.0;LBNWM[1]:=0.0;END;UFIG:=UFIG+1;BWVK:=2;VRO:=14.0;YSOFVQ:=8.0;CASE BWVK OF 0:BEGIN ABBZPR:=ABBZPR+VRO*(JXQOP-MLIFG);AHHKC(ABBZPR);YIXZ[UFIG]:=JXQOP;NCY[UFIG]:=MLIFG;LBNWM[UFIG]:=NO; END;1:BEGIN VDWAP(JXQOP,NO,ABBZPR);AHHKC(ABBZPR);YIXZ[UFIG]:=JXQOP;NCY[UFIG]:=MLIFG;LBNWM[UFIG]:=NO; END;2:BEGIN KJQ[DJFE+1]:=MLIFG;FB(KJQ,WZX,LRZSYQ,POMELB,TOHOAN);VDWAP(JXQOP,MLIFG,ABBZPR);AHHKC( ABBZPR);WZX[DJFE+1]:=ABBZPR;YIXZ[UFIG]:=JXQOP;NCY[UFIG]:=MLIFG;LBNWM[UFIG]:=NO;VAMQ(KJQ,WZX);END;END ;WBPXSY[UFIG]:=WBPXSY[UFIG-1]+EFUVM;IF UFIG=300 THEN BEGIN UFIG:=299;FOR GWQK:=1 TO UFIG DO BEGIN YIXZ[GWQK]:=YIXZ[GWQK+1];NCY[GWQK]:=NCY[GWQK+1];LBNWM[GWQK]:=LBNWM[GWQK+1];WBPXSY[GWQK]:=WBPXS +1];END;END;IF KEYPRESSED THEN TZJVFI:=1;SUAHNI;UNTIL TZJVFI=1;WRITE(
'Rerun the test with other speed ? ');READ(KBD,ZHNN);IF (ZHNN='Y') OR (ZHNN='y') THEN BEGIN GOTO GLXPQ;END ELSE TGUF;XLB;LEGJ;END.

```
#include "stdio.h"
extern void cursor(int dom);
float xcal[10],ycal[10],mm[6],oo[6];
float a,b,c,pfkkyeav7,pfkkyeav8,pfkkyeav9,pfkkyer34,pfkkyek69,pfkkyeau6,t=0.25;
float g=1,pf66h45w,pfkkyecgf1,pf66h47q,uu=26,pfkkyeh45;
int dsp,ms,chn=0,ctr=0,pf66ggde;

void a0gh34(int cnt,int ch)
{
float sumx,sumy,smxy,smxx;
int j;
sumx=sumy=smxy=smxx=0;
for (j=1; j<=cnt; j++) {
   sumx=sumx+xcal[j];
   sumy=sumy+ycal[j];
   smxy=smxy+ycal[j]*xcal[j];
   smxx=smxx+xcal[j]*xcal[j];
   }
mm[ch]=(cnt*smxy-sumy*sumx)/(cnt*smxx-sumx*sumx);
oo[ch]=(sumy-mm[ch]*sumx)/cnt;
   buffer(0x7F00);
for (j=0; j<=5; j++) {
   save(mm[j]);
   save(oo[j]);
   }
```

```
}
float f09we56(void)
{
    trigger(33333);
    while(read_bit(SMP_bit)) {}
    pf66ggde=mm[0]*get_data(0)+oo[0];
    pfkkyecgf1=mm[2]*get_data(2)+oo[2];
    return(pf66ggde*pfkkyeh45-pf66h47q*pfkkyeh45*pfkkyecgf1/uu);
} void f09we57(ioarray am, ioarray bm, int imp, int inp, int ipp,
            ioarray cm)
{
 int i,j,k;
 float sum;

for(i = 1; i <= imp; i++)
 {
   for(j = 1; j <= ipp; j++)
   {
     sum=0.;
     for(k = 1; k <= inp; k++)
     {
       sum = sum + am[i][k] * bm[k][j];
     }
     cm[i][j] = sum;
   }
 }
} void fkk231a5()
{
 int i,j;
 while(!read_bit_and_clear(CLK_5_bit)) {}
 while(!read_bit_and_clear(CLK_5_bit)) {}
 y[1]=f09we56();
 u[1]=u[n1];
 theta[1][1]=0;
 theta[2][1]=g;

for(i = 1; i <= 2*pfkkyek68; ++i)
 {
   for(j = 1; j <= 2*pfkkyek68; ++j)
   {
     if (i == j)
       p[i][j] = 1.0;
     else
       p[i][j] = 0.0;
   }
 }
} void pq5y89e ( syarray y, syarray u, ioarray p, ioarray theta)
{
 float   ytrue,tiny;
 int     n1,n2,i,j;
 ioarray phi,phit,pphi,phitpphi,phittheta,pphiphit,ppptp;
```

```
tiny = 1.0e-19;  n1 = pfkkyek68 + 1;  n2 = 2 * pfkkyek68;  ytrue = y[n1];
   phi[1][1] = -y[1]; phi[2][1] = u[1];phit[1][1]=phi[1][1];
   phit[1][2]=phi[2][1];

f09we57(p,phi,n2,n2,1,pphi);
f09we57(phit,pphi,1,n2,1,phitpphi);
if (absolute(phitpphi[1][1])>tiny)
{
 f09we57(phit,theta,1,n2,1,phittheta);
 yerror = ytrue - phittheta[1][1];
 theta[1][1] = theta[1][1] + pphi[1][1] * (yerror) / phitpphi[1][1];
 theta[2][1] = theta[2][1] + pphi[2][1] * (yerror) / phitpphi[1][1];

f09we57(pphi,phit,n2,1,n2,pphiphit);
 f09we57(pphiphit,p,n2,n2,n2,ppptp);
 for(i = 1; i <= n2; ++i)
 {
   for(j = 1; j <= n2; ++j)
   {
     p[i][j] = p[i][j] - ( ppptp[i][j] / phitpphi[1][1] );
   } /* of j */
 } /* of i */

} /* of if */
if(y[n1]!=0)
rel_yerror=yerror/y[n1];
else
rel_yerror=0;

}
void pfkkyek65(void)
{
printf("\n>ENTER***");
      clear_keys(1000,0);
while(true) {
do {
printf("\nCCCCCC\n");
 clear_keys(600,600);
   if(read_bit(KEY1_bit))
    goto endvis;
  if(read_bit(KEY4_bit)) {
  pfkkyeav7=read_num(pfkkyeav7);
 }
} while(!read_bit(KEY3_bit));
do {
printf("\nCVVVVV\n");
 clear_keys(600,600);
   if(read_bit(KEY1_bit))
    goto endvis;
  if(read_bit(KEY4_bit)) {
  pfkkyeav8=read_num(pfkkyeav8);
 }
} while(!read_bit(KEY3_bit));

do {
printf("\nCSSSSS\n");
 clear_keys(600,600);
   if(read_bit(KEY1_bit))
    goto endvis;
  if(read_bit(KEY4_bit)) {
  pfkkyeav9=read_num(pfkkyeav9);
```

```
        }
     } while(!read_bit(KEY3_bit));
   }/*end true*/
   endvis:   printf("\n<EXIT****");
             clear_keys(900,0);
   }/*end routine*/ void pfkkyecgf2(void)
   {
   printf("\n>ENTER***");
   clear_keys(1000,0);
   while(true) {
   printf("\nEDT");
   do {
   clear_keys(600,600);
      if (read_bit(KEY1_bit))
          goto finished;
      if(read_bit(KEY4_bit)) {
          ++ctr;
          xcal[ctr]=dsp;
          ycal[ctr]=read_num(0);
          goto finshd;
      }
   } while(!read_bit(KEY3_bit));
   printf("\nFIAA");
   do {
   clear_keys(600,600);
      if (read_bit(KEY1_bit))
          goto finished;
   if(read_bit(KEY4_bit)) {
   if(ctr<3) {
       printf("\nMMMMM");
       clear_keys(5000,2);
       }
    else
       {
          a0gh34(ctr,chn);
          ctr=0;
       }
   goto finished;
   }
   } while(!read_bit(KEY3_bit));
   printf("\nCFFFFF ");
   do {
   clear_keys(600,600);
      if (read_bit(KEY1_bit))
          goto finished;
    if(read_bit(KEY4_bit)) {
          mm[chn]=1.0;
          oo[chn]=0.0;
          buffer(0x7F00);
       for(i=0; i<=5; i++) {
          save(mm[i]);
          save(oo[i]);
       }
          goto finished;
     }
   } while(!read_bit(KEY3_bit));
```

```
      }
   finished: printf("\n<EXIT****");
   clear_keys(1000,0);
   finshd:;
   }
   void pfkkyecge5(void)
   {
   printf("\n>ENTER***");
        clear_keys(1000,0);
   while(true) {
   do {
   printf("\nXXXXXX\n");
      clear_keys(600,600);
        if(read_bit(KEY1_bit))
          goto endsys;
        if(read_bit(KEY4_bit)) {
     pfkkyeh45=read_num(pfkkyeh45);
      }
   } while(!read_bit(KEY3_bit));
   do {
   printf("\nXXXXXXXX\n");
      clear_keys(600,600);
        if(read_bit(KEY1_bit))
          goto endsys;
        if(read_bit(KEY4_bit)) {
     pf66h47q=read_num(pf66h47q);
      }
   } while(!read_bit(KEY3_bit));
   do {
   printf("\nXXXXXXX\n");
      clear_keys(600,600);
        if(read_bit(KEY1_bit))
          goto endsys;
        if(read_bit(KEY4_bit)) {
     pfkkyek65();
      }
   } while(!read_bit(KEY3_bit));
   do {
   printf("\nXXXXXXX\n");
      clear_keys(600,600);
        if(read_bit(KEY1_bit))
          goto endsys;
     if(read_bit(KEY4_bit)) {
     pfkkyek69=read_num(pfkkyek69);
      }
   } while(!read_bit(KEY3_bit));
   do {
   printf("\nXXXXXXXX\n");
      clear_keys(600,600);
        if(read_bit(KEY1_bit))
          goto endsys;
        if(read_bit(KEY4_bit)) {
     pfkkyer34=read_num(pfkkyer34);
      }
   } while(!read_bit(KEY3_bit));
   do {
   printf("\XXXXXXXX\n");
      clear_keys(600,600);
```

```
        if(read_bit(KEY1_bit))
            goto endsys;
    if(read_bit(KEY4_bit)) {
    pfkkyeau6=read_num(pfkkyeau6);
    }
    } while(!read_bit(KEY3_bit));
    }/*end true*/
endsys:    printf("\n<EXIT****");
        clear_keys(900,0);
        buffer(0x7F80);
        save(pfkkyeh45);
        save(pf66h47q);
        save(uu);
        save(pfkkyek69);
        save(pfkkyer34);
        save(pfkkyeau6);
        save(pfkkyeav7);
        save(pfkkyeav8);
        save(pfkkyeav9);
}/*end routine*/ void pfkkyecge7(void)
    {
    trigger(33333);
printf("\n>ENTER***");
clear_keys(1000,0);
do {
    trigger(33333);
    clear_keys(100,700);
    if (read_bit(KEY3_bit)) {
    if (chn>4)
    chn=-1;
    ++chn;
    }
    if (read_bit(KEY4_bit))
    pfkkyecgf2();
    dsp=get_data(chn);
    printf("\n%1u=%6.1f\n",chn,dsp*mm[chn]+oo[chn]);
    } while (!read_bit(KEY1_bit));
printf("\n<EXIT****");
clear_keys(1000,0);
    } void monitor(int mo)
    {
    if (mo>4)
        mo=4;
    if (mo<=0)
        mo=0;
    switch (mo) {
    case 0:
        printf("\nXX=%5.2f",y[n1]);
        break;
    case 1:
        printf("\nXX=%5.2f",mm[1]*get_data(1)+oo[1]);
        break;
    case 2:
        printf("\nXX=%4d",pf66ggde);
        break;
    case 3:
        printf("\nXX=%5.1f",pfkkyecgf1);
        break;
    case 4:
        printf("\nXX=%5.1f",mm[3]*get_data(3)+oo[3]);
    }
    }
void pfkkyecge9()
{
    y[n1]=f09we56();
    u[n1]=u[n1]+a*(pf66h45w-y[n1]);
    if (u[n1]>=1023)
    u[n1]=1023;
    if (u[n1]<=0)
    u[n1]=0;
    pfkkyek67(u[n1]);
    if(u[n1]!=0)
    g=y[n1]/u[n1];
}
void pfkkyecge8(void)
{
float erna,ernb,ernc;
    y[n1]=f09we56();
    erna=pf66h45w-y[n1];
    u[n1]=u[n1]+a*erna+b*ernb+c*ernc;
    ernc=ernb;
    ernb=erna;
    if(u[n1]>=1023)
    u[n1]=1023;
    if(u[n1]<=0)
    u[n1]=0;
    pfkkyek67(u[n1]);
    if(u[n1]!=0)
    g=y[n1]/u[n1];
}
void pq5y89f(void)
{
    y[n1]=f09we56();
    pfkkyek67(u[n1]);
    pq5y89e(y,u,p,theta);
    y[1]=y[n1];
    u[1]=u[n1];
    /*if(rel_yerror<0.05)*/
    u[n1]=(theta[1][1]*y[n1]+pf66h45w)/theta[2][1];
    /*else
    u[n1]=u[n1]+a*(pf66h45w-y[n1]);*/
    if(u[n1]>=1023)
    u[n1]=1023;
    if(u[n1]<=0)
    u[n1]=0;
}
void pfkkyecge6(void)
    {
printf("\n>ENTER***");
clear_keys(900,0);
a=pfkkyek69+pfkkyer34*t/2+pfkkyeau6/t;
b=pfkkyer34*t/2-pfkkyek69-2*pfkkyeau6/t;
c=pfkkyeau6/t;
while(true) {
do {
```

```
printf("\nPRPRPR\n");
  clear__keys(600,600);
    if(read__bit(KEY1__bit))
    goto endctrl;
    if(read__bit(KEY4__bit)) {
    pf66h45w=read__num(pf66h45w);
    while(!read__bit__and__clear(CLK__4__bit)) {}
  while(!read__bit(KEY1__bit)) {
    while(!read__bit__and__clear(CLK__4__bit)) {}
    pfkkyecge9();
    if (read__bit(KEY3__bit))
    ++ms;
    if (read__bit(KEY2__bit))
    --ms;
    monitor(ms);
    clear__bit(KEY3__bit);
    clear__bit(KEY2__bit);
}}

} while(!read__bit(KEY3__bit));
do {
printf("\nPPPPP \n");
  clear__keys(600,600);
    if(read__bit(KEY1__bit))
    goto endctrl;
    if(read__bit(KEY4__bit)) {
    pf66h45w=read__num(pf66h45w);
    while(!read__bit__and__clear(CLK__4__bit)) {}
  while(!read__bit(KEY1__bit)) {
    while(!read__bit__and__clear(CLK__4__bit)) {}
    pfkkyecge8();
    if (read__bit(KEY3__bit))
    ++ms;
    if (read__bit(KEY2__bit))
    --ms;
    monitor(ms);
    clear__bit(KEY3__bit);
    clear__bit(KEY2__bit);
}}
} while(!read__bit(KEY3__bit));
do {
printf("\nININIM");
  clear__keys(600,600);
    if(read__bit(KEY1__bit))
    goto endctrl;
    if(read__bit(KEY4__bit)) {
    pf66h45w=read__num(pf66h45w);
    fkk231a5();
  while(!read__bit(KEY1__bit)) {
    while(!read__bit__and__clear(CLK__5__bit)) {}
    pq5y89f();
    if (read__bit(KEY3__bit))
    ++ms;
    if (read__bit(KEY2__bit))
    --ms;
    monitor(ms);
    clear__bit(KEY3__bit);
    clear__bit(KEY2__bit);
}}

} while(!read__bit(KEY3__bit));
}/*end true*/
endctrl: printf("\n<EXIT****");
clear__keys(900,0);
} void main(void)
{
pfkkyek67(0);
printf("\nFES TEV1");
   buffer(0x7F00);   /*load futch factors*/
   for (i=0; i<=5; i++) {
     mm[i]=load();
     oo[i]=load();
   }
   buffer(0x7F80);   /*load configuration information*/
   pfkkyeh45=load();
   pf66h47q=load();
   uu=load();
   pfkkyek69=load();
   pfkkyer34=load();
   pfkkyeau6=load();
   pfkkyeav7=load();
   pfkkyeav8=load();
   pfkkyeav9=load();
   clear__keys(5000,2);
   pfkkyek68=1;
   n1=pfkkyek68+1;
   u[n1]=0;
while(true) {
do {
printf("\nCSCSN");
   clear__keys(600,600);
   if(read__bit(KEY4__bit))
     pfkkyecge7();
  } while(!read__bit(KEY3__bit));
do {
printf("\nSYSYSY");
   clear__keys(600,600);
   if(read__bit(KEY4__bit))
     pfkkyecge5();
  } while(!read__bit(KEY3__bit));
do {
printf("\nCTCTCT ");
   clear__keys(600,600);
   if(read__bit(KEY4__bit))
     pfkkyecge6();
  } while(!read__bit(KEY3__bit));
}/*end of true*/
}/*end of main*/
```

We claim as our invention:

1. Apparatus for generating a comparative plant output signal for a plant comprising, an output adjustment algorithm means which calculates the discrepancy made up of the real adjustments performed on the normal operating parameters, the envionmental forcing parameters, the symptomatic monitoring parameters and the calibration adjustment parameters of the system that exists between a theoretical real time plant simulator and the required signal to the control means for generating operating parameter signals, said theoretical real time plant simulator receiving inputs from said means for generating operating parameter signals and an adder receiving the outputs of said real time plant simulator and said output adjustment algorithm means.

2. Apparatus for generating a comparative plan output signal according to claim 1, wherein said output adjustment algorithm means will compensate for changes in environmental forcing parameters (EFP) of the plant enviorns which are the parameters required to account for the drift of the operating point due to enviornmental changes such as dust level and temperature and vibrations.

3. Apparatus for generating a comparative plant output signal according to claim 2, wherein said output adjustments algorithm means will compensate for changes in the symptomatic or diagnostic monitoring parameters (SMP) of the plant which are the parameters required to account for performance degradation and component and plant abnormalities such as wear, noise, and heat.

4. Apparatus for generating a comparative plant output signal according to claim 3, wherein said output adjustment algorithm means will compensate for changes in the calibration coefficients for the plant characteristics such as changes which may result because of repairs, replacements, modifications, updating substitutions, and adjustments in plant components and conditions.

5. Apparatus as described in claims 1 or 2 or 3 or 4 which uses an external computing device to provide an output adjustment signal.

6. Apparatus according to claim 5 which uses a simple level control process in which a tracking error equals the desired output signal minus the comparative plant output signal.

7. Apparatus according to claim 6 which uses an external computing means to provide tracking signal and the control process algorithms.

8. Apparatus according to claim 7 which uses a time sharing means (TSO) to allocate the CPU time of a central processor between data acquisition and algorithmic calculations.

9. Apparatus according to claim 7 which has an instrumental module which accepts and generates industrial standard interfacing signals based on specified current, voltage and frequency ranges which are independent of the type of transducers or actuators used.

10. Apparatus according to claim 9 which has data logging capability for implementing the learned information and recorded data in a reduced and compact form suitable for providing symptomatic analysis and diagnostic assessment and evaluation.

11. Apparatus according to claim 6 which uses inplant, on-chip type hardware to store the control process algorithms and provide the tracking for the control of the plant.

12. Apparatus according to claim 5 which uses an optimal control algorithm to process the desired output and comparative plant output signals to establish the optimal tracking error signal for the controllable plant.

13. Apparatus according to claim 5 which utilizes system identification, parameter, and adaptive control algorithms to process the desired output and comparative plant output signals so as to establish the adaptive type tracking error signal for said plant.

14. Apparatus according to claim 5 which utilizes system identification, parameter estimation, adaptive control, and learning control algorithms so as to process the desired output and comparative plant output signals to establish the learning type tracking error signal for said plant.

15. Apparatus according to claim 1 or 2 or 3 or 4, which uses a comparative signal generated by on-chip type hardware in which the output adjustment algorithm and the real time plant simulator algorithm are stored.

16. Means for operating a pump at a desired fluid flow by sensing parameters other than those associated with passive flow measuring elements comprising a driving means connected to drive said pump, means for sensing fluid pressure in said pump, means for sensing pump speed, a computer receiving the outputs of said means for sensing pressure and said means for sensing pump speed, a memory connected to said computer, an input means connected to said computer for setting a desired fluid flow, and the output of said computer connected to said driving means to drive it at a speed so as to obtain said desired fluid flow including a driving means controller connected between said computer and said driving means, and wherein said driving means controller is a pump speed controller wherein said computer determines the required speed for said pump from the equation $$N = \frac{Q_a}{D} + C_s \times \frac{\Delta p}{\mu}$$

where N is the required pump speed, D is the displacement of the pump, Cs is the slip coefficient, Qa is the desired flow rate of fluid, $\Delta p$ is the differential pressure across the pump and $\mu$ is the viscosity of the fluid.

17. A means for operating a pump according to claim 16 further including an indicator connected to the output of said computer.

18. Means for operating a pump at a desired fluid flow by sensing parameters other than those associated with passive flow measuring elements comprising, a driving means connected to drive said pump, means for sensing fluid pressure in said pump, means for sensing pump speed, a computer receiving the outputs of said means for sensing pressure and said means for sensing pump speed, a memory connected to said computer, an input means connected to said computer for setting a desired fluid flow, and the output of said computer connected to said driving means to drive it at a speed so as to obtain said desired fluid flow including a driving means controller connected between said computer and said driving means, and wherein said driving means controller is a frequency converter, wherein said computer determines the required speed for said pump from the equation $$N = \frac{Q_a}{D} + C_s \times \frac{\Delta p}{\mu}$$

where N is the required pump speed, D is the displacement of the pump, Cs is the slip coefficient, Qa is the desired flow rate of fluid, $\Delta p$ is the differential pressure across the pump and $\mu$ is the viscosity of the fluid.

19. Means for operating a pump according to claim 18 including means for sensing fluid temperature connected to supply an input to said computer.

20. Means for operating a pump according to claim 18 wherein said means for sensing fluid pressure includes a sensor for sensing the input fluid pressure in said pump and a sensor for sensing output fluid pressure of said pump.

21. Means for calibrating a pump by operating the pump at multiple speeds and sensing parameters other than those associated with passive flow measuring elements comprising a driving means connected to drive said pump, means for sensing fluid pressure in said pump, means for sensing pump speed, a computer receiving the outputs of said means for sensing fluid pressure and said means for sensing pump speed, a memory connected to said computer, an input means connected to said computer for setting desired multiple pump speeds, and the output of said computer connected to said driving means to drive it at multiple speeds so as to obtain said multiple speeds including a driving means controller connected between said computer and said driving means, and wherein said driving means controller is a pump speed controller, wherein said computer determines the slip coefficient (Cs) for said pump from the equation:

$$\frac{Q_c}{Q_s} = 1 - C_s \frac{\Delta p}{\mu N} \text{ where}$$

$Q_c$ is the comparative output flow,
$Q_s$ is the theoretical flow,
$C_s$ is the slip coefficient,
$\Delta p$ is is the pressure differential,
$\mu$ is the viscosity, N is the RPM of the motor and from the equation:

$$K_{\Delta} p^m = A + S \cdot N$$

where
K is a constant, m is an exponent which is 1 for laminar flow and 0.5 for turbulent flow,
A is an intersect value of the regression line,
S is the slope of the regressing line, and
N is the RPM of the motor.

* * * * *